United States Patent

[11] 3,615,268

| [72] | Inventor | Fletcher L. Moore<br>Knoxville, Tenn. |
|---|---|---|
| [21] | Appl. No. | 780,101 |
| [22] | Filed | Nov. 29, 1968 |
| [45] | Patented | Oct. 26, 1971 |
| [73] | Assignee | The United States of America as represented by the United States Atomic Energy Commission |

[54] ISOLATION AND PURIFICATION OF AMERICIUM FROM OTHER 5f AND 4f ELEMENTS BY EXTRACTION CHROMATOGRAPHY
3 Claims, 1 Drawing Fig.

[52] U.S. Cl. .................................................. 23/338, 23/337, 23/340, 23/343, 252/301.1
[51] Int. Cl. .......................................................... C01g 56/00
[50] Field of Search ............................................ 23/337, 338, 339, 341, 342, 343; 252/301.1

[56] References Cited
UNITED STATES PATENTS

| 2,683,655 | 7/1954 | Peppard et al. | 23/341 |
| 2,741,627 | 4/1956 | Thompson et al. | 23/338 |
| 2,874,025 | 2/1959 | Moore | 23/339 |
| 2,925,431 | 2/1960 | Choppin et al. | 260/429.2 |
| 2,934,403 | 4/1960 | Ader et al. | 23/339 |
| 3,320,033 | 5/1967 | Goren | 23/337 |
| 3,402,027 | 9/1968 | Moore | 23/343 |

Primary Examiner—Carl D. Quarforth
Assistant Examiner—F. M. Gittes
Attorney—Roland A. Anderson ABSTRACT: A method for selectively removing americium values from an aqueous solution containing americium as well as other 5f and/or 4f elements which comprises selectively oxidizing the americium to the +5 oxidation state and then passing the resultant solution through a stationary phase or static bed of an inert material having impregnated on its surface a diester of orthophosphoric acid such as di(2-ethylhexyl)phosphoric acid.

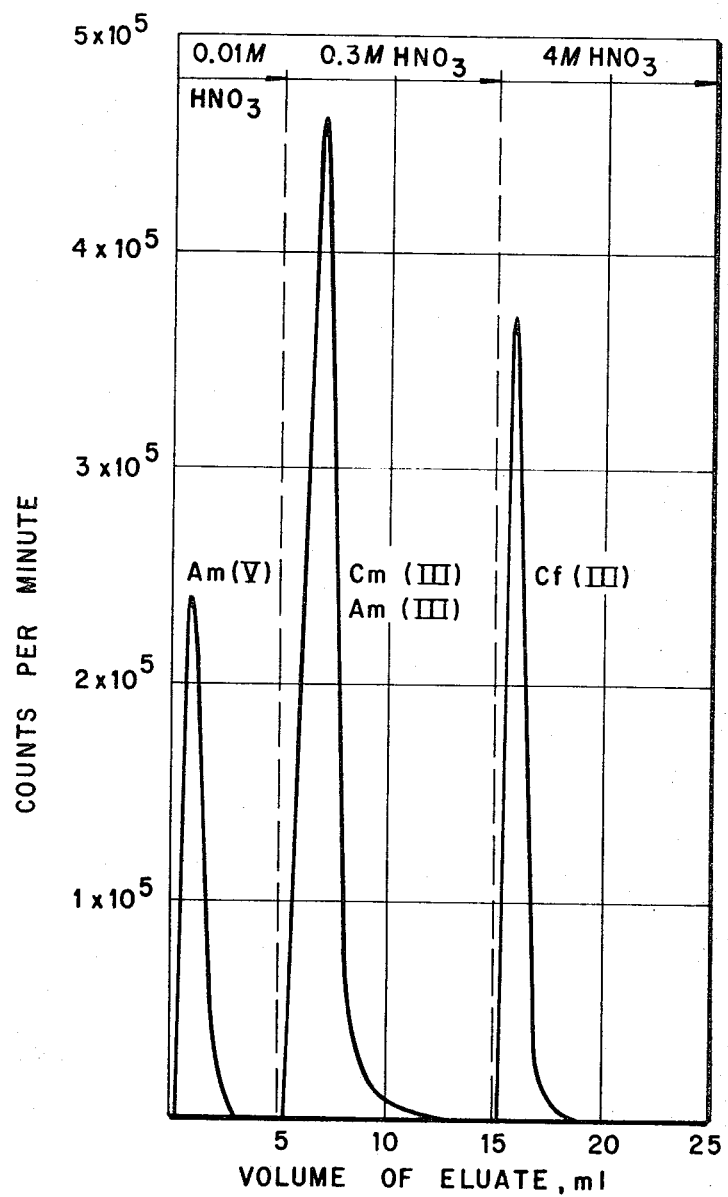

ISOLATION AND PURIFICATION OF AMERICIUM FROM OTHER 5f AND 4f ELEMENTS BY EXTRACTION CHROMATOGRAPHY

BACKGROUND OF THE INVENTION

This invention was made in the course of, or under, a contract with the U.S. Atomic Energy Commission.

The present invention relates to a method for selectively removing americium from a solution of americium together with other 5f and 4f elements. Due to its high sensitivity of separation it is amenable for analytical purposes, for removing trace amounts of americium from gross quantities where its presence is undesirable, and for macroseparations principally from curium, an element which is most closely related in chemical properties to americium.

It is the principal object of this invention to provide a method of isolating and purifying americium from other 5f and 4f elements by a simple, rapid, and efficient method.

SUMMARY OF THE INVENTION

This invention is predicated on the discovery that americium in acid solution can be selectively oxidized to the +5 oxidation state to produce a feed solution from which the americium can be selectively isolated within several minutes. Isolation of the americium takes place by passing this feed solution over a permeable bed or column of an inert powder coated with a dialkylphosphoric acid such as di(2-ethylhexyl)phosphoric acid. During the course of oxidizing the americium to the +5 oxidation state, other 5f and 4f elements in solution will be oxidized to either their +3 or +6 oxidation states. In these circumstances, when the oxidized solution is then passed through a column or bed of the character just described, the ions in the +3 and +6 oxidation states will be selectively extracted onto the column or bed of the dialkylphosphoric acid and the americium in the +5 oxidation state will be selectively and quantitatively eluted with a dilute solution of nitric acid.

BRIEF DESCRIPTION OF THE DRAWING

The FIGURE shows the elution profile obtained when a solution of americium, californium, and curium is treated in accordance with the process of the present invention.

DESCRIPTION OF THE PREFERRED EMBODIMENT

Successful selective and quantitative separation of americium by extraction chromatography depends upon conducting the oxidation of the americium-containing solution within certain critical limiting parameters which will now be described in detail.

Prior to this invention, it was known that americium in the +3 oxidation state could be oxidized to americium in the +6 oxidation state by use of ammonium persulfate in the presence of silver ion. In the present invention, the same oxidizing agent, ammonium persulfate, is used, except in the absence of silver ion, to produce the desired americium +5 oxidation state. The solution to be oxidized is defined as a nitric acid solution in the range 0.01 molar to 0.2 molar, and preferably 0.01 to 0.05 molar $HNO_3$, which does not contain excess quantities of fluoride, chloride, or sulfate anion. These limitations are based on the finding that a solution less than 0.01 molar in nitric acid results in the precipitation of metal ions in the solution and interferes with the quantitative oxidation of americium. Although americium can be recovered in high yields at nitric acid concentrations less than 0.01 molar, it is often impractical because it leads to hydrolysis and precipitation of other metal ions, thereby introducing mechanical problems in the extraction columns as well as causing coprecipitation losses. Nitric acid concentrations greater than about 0.02 molar reduce the yields by inhibiting the oxidation of americium. Moreover, under such conditions, premature elution of curium and other elements occurs. The presence of undue quantities of fluoride ions in solution should be avoided since these anions tend to stabilize americium in its highest (+6) oxidation state, a form in which it is unextractable under the conditions of this invention. Chloride prevents quantitative oxidation of americium. Sulfate ions are to be avoided in solution because they prevent the efficient and selective sorption of metal ions other than americium on the extraction chromatography column.

Ammonium persulfate does not oxidize americium at room temperature. Efficient oxidation does occur at a persulfate concentration in the range 0.05 to 0.4 molar at a temperature in the range 80–90° C., requiring only a 10-minute oxidation period. Following oxidation, the solution is cooled for a period of 5 to 10 minutes in an ice bath and is then in condition to serve as the feed solution for passing through an extraction chromatography column. Before introduction to the column, the solution should be adjusted to less then about 0.1 molar in nitric acid.

The extraction chromatography column may consist of any inert powder having a hydrophobic surface. In the prior art, diatomaceous earths have been used which are subsequently coated with the desired extraction agent. For the purposes of this invention, I have found that Teflon (polytetrafluoroethylene) powder having a particle size in the range equivalent to 60–100 mesh is particularly suitable since it requires no special treatment to render it hydrophobic. In order to prepare the bed, a 1-molar solution of di(2-ethylhexyl)phosphoric acid in an organic solvent such as heptane is intimately mixed to form a permeable column. In general, it is sufficient to use from 1 to 2 milliliters of the di(2-ethylhexyl)phosphoric acid-heptane for each gram of powder. A column of this mixture was packed to a height of 70 millimeters by 5 millimeters in diameter after allowing excess solvent to drain off. The column was then preconditioned by passing a volume of 0.01 molar nitric acid through it to obtain a flow rate of 5 to 10 drops per minute. After fixing the feed solution on the column, elution of americium can be effected with a nitric acid solution in the range $1 \times 10^{12}$ to $1 \times 10^{16}$ molar.

Having described the method of preparing the feed solution for the extraction chromatography column, and having described how the column is prepared, the following examples illustrate how the efficient, rapid isolation of americium can take place.

EXAMPLE I

A sample solution containing known quantities of americium-241, curium-244, and californium-252 was prepared in 0.1 molar nitric acid. One hundred microliters of a freshly prepared oxidant consisting of 0.5 molar ammonium persulfate was a added and gently mixed with the nitric acid solution. The americium in the mixture was oxidized by heating the solution in a water bath at 80–90° C. for 10 minutes. The solution was then cooled in an ice bath for 5 minutes and then pipetted into the extraction column. After addition of the sample solution to the extraction column, the column was washed with 0.01 molar nitric acid. Elutions were conducted at room temperature. A typical elution profile resulting from carrying out the process with the limitations hereinbefore described is shown in the figure. The pH range of the americium product was 1.9 to 2.1. For the sake of clarity, the elution of curium and californium with more concentrated solutions of nitric acid is shown. The clear-cut separation is apparent from the elution profile curve. The recovery of americium and its decontamination from curium-244 were excellent. Yields averaging from 90 to 95 percent were obtained with a curium-244 decontamination factor in the range $2 \times 10^5$ to $3 \times 20^5$; the californium separation factor was greater than $4 \times 10^5$.

In the previous description, I have described the method as one depending upon the oxidation of americium to the +6 oxidation state. A plausible mechanism for the experimental results which occur can be explained by regarding persulfate as functioning to oxidize americium +3 to the +6 oxidation state. In the absence of a holding oxidant, like silver ion, or a strong complexing ion, like fluoride or chloride, the americium apparently reduced to the +5 ($AmO_2^+$) ion. Americium +5 is known to disproportionate to americium +3 and americium +6. The rate of disproportionation is apparently slow enough to allow effective separation of americium. Apparently, according to the present method, this disproportionation of americium +5 or reduction of americium +6 to americium +3 occurs at a sufficiently low rate to enable successful selective elution of the $AmO_2^+$ ion which exhibits a negligible tendency to complex with the di(2-ethylhexyl)phosphoric acid and sorb on the column. Hence, it elutes rapidly and essentially quantitatively.

EXAMPLE II

To demonstrate the separation of americium-241 from $4f$ elements the $4f$ analog of americium, europium, was used. A sample solution containing americium-241 ($2-4\times10^5$ gamma counts/minute/milliliter) and europium-152-154 ($3\times10^5$ gamma counts/minute/milliliter) was run through the procedure described above in example I. The americium-241 product gave a yield of 95.2 percent and contained <0.0001 percent europium (decontamination factor = $1\times10^5$). The europium-152-154 readily eluted (>99.5 percent) with 10 milliliters of 4-molar $HNO_3$.

What is claimed is:
1. A method for the separation of americium from a 0.01 to 0.2 molar nitric acid solution containing americium as well as other $5f$ or $4f$ elements which comprises reacting at a temperature from about 80° to about 90° C. the solution with an oxidizing concentration of 0.05 to 0.04 molar ammonium persulfate in the absence of silver ion to selectively oxidize the americium to the +5 oxidation state cooling the resulting solution and then passing the resultant solution through a column of an inert hydrophobic powder the particles of which are coated with a dialkylphosphoric acid derivative, and thereafter selectively eluting the oxidized americium.

2. The method according to claim 1 in which the oxidized americium in the $\times 5$ oxidation state is eluted from the column by an eluate containing nitric acid in the range $1\times 10^12$ to $1\times 10^1$ molar.

3. The method according to claim 1 in which the dialkylphosphoric acid is di(2-ethylhexyl)phosphoric acid.

PO-1050
(5/69)

UNITED STATES PATENT OFFICE
CERTIFICATE OF CORRECTION

Patent No. 3,615,268      Dated October 26, 1971

Inventor(s) Fletcher L. Moore

It is certified that error appears in the above-identified patent and that said Letters Patent are hereby corrected as shown below:

Column 1, line 72, "0.02" should read ---0.2---.

Column 2, line 16, "then" should read ---than---; line 38, "$10^{12}$" should read ---$10^{-2}$--- and "$10^{16}$" should read ---$10^{-6}$---; line 51, delete "a" before "added"; line 68, "$20^5$" should read ---$10^5$---.

Column 3, line 22, before "1 x $10^5$" insert --- > ---.

Column 4, line 8, "0.04" should read ---0.4---; line 10, insert a comma (,) after "state"; line 17, "x5" should read --- +5 ---; line 18, "$10^{12}$" should read ---$10^{-2}$---; line 19, "$10^1$" should read ---$10^{-6}$---.

Signed and sealed this 4th day of July 1972.

(SEAL)
Attest:

EDWARD M. FLETCHER, JR.
Attesting Officer

ROBERT GOTTSCHALK
Commissioner of Patents